(12) United States Patent
Shiah

(10) Patent No.: US 6,935,011 B2
(45) Date of Patent: Aug. 30, 2005

(54) METHOD OF FORMING A STATOR FOR A BRUSHLESS MOTOR

(75) Inventor: Kyi-Shin Shiah, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 203 days.

(21) Appl. No.: 10/212,321

(22) Filed: Aug. 5, 2002

(65) Prior Publication Data

US 2004/0020027 A1 Feb. 5, 2004

(51) Int. Cl.⁷ .................. H02K 15/00; H02K 15/14; H02K 15/16
(52) U.S. Cl. .............. 29/596; 29/598; 29/606; 29/609; 310/42; 310/43; 310/259
(58) Field of Search .................. 29/596, 598, 606, 29/609; 310/42, 43, 259

(56) References Cited

U.S. PATENT DOCUMENTS

| | | | |
|---|---|---|---|
| 4,912,353 A | 3/1990 | Kondo et al. | |
| 5,086,245 A | 2/1992 | Sieja et al. | |
| 5,189,323 A | 2/1993 | Carr et al. | |
| 5,616,977 A | 4/1997 | Hill | |
| 5,773,905 A | 6/1998 | Hill | |
| 6,167,610 B1 * | 1/2001 | Nakahara et al. | 29/596 |
| 6,225,725 B1 | 5/2001 | Itoh et al. | |
| 6,281,612 B1 * | 8/2001 | Asao et al. | 310/179 |
| 6,348,751 B1 | 2/2002 | Jermakian et al. | |
| 6,348,753 B1 | 2/2002 | Sakai et al. | |
| 2001/0005104 A1 | 6/2001 | Nakahara et al. | |

FOREIGN PATENT DOCUMENTS

| | | |
|---|---|---|
| EP | 087 1282 A1 | 10/1998 |
| GB | 2303744 A | 2/1997 |
| JP | 200137115 A | 2/2001 |
| JP | 2001161039 A | 6/2001 |
| JP | 2001333552 A | 11/2001 |

OTHER PUBLICATIONS

UK Search Report.

* cited by examiner

Primary Examiner—Carl J. Arbes
Assistant Examiner—Tim Phan
(74) Attorney, Agent, or Firm—Brinks Hofer Gilson & Lione

(57) ABSTRACT

A method of forming a stator for a brushless motor comprising providing a stator core having a generally rectangular body and having a plurality of teeth extending generally perpendicularly from a side of the body, and forming the stator core into a generally circular shape.

4 Claims, 6 Drawing Sheets

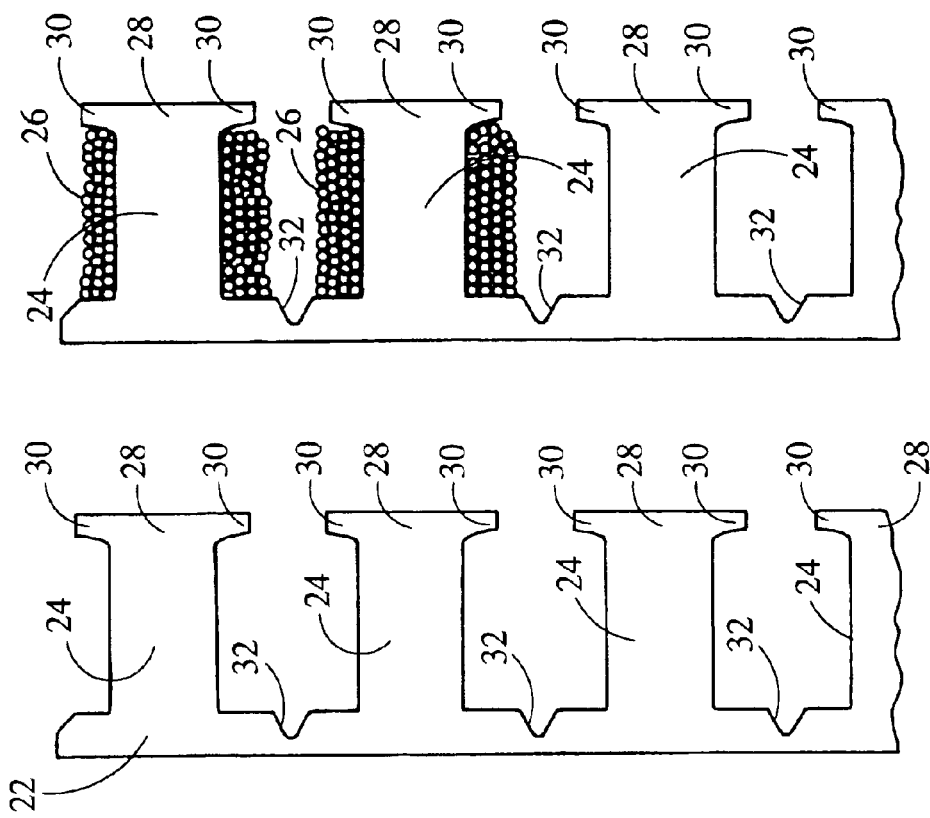
Fig. 4
Fig. 3
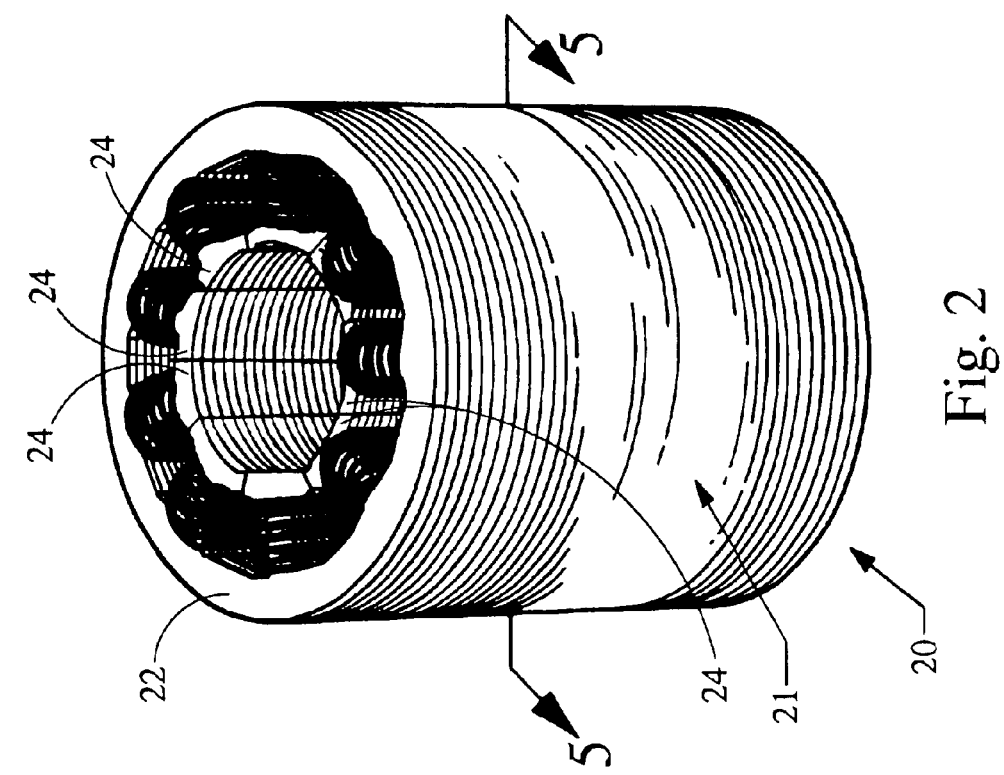
Fig. 2

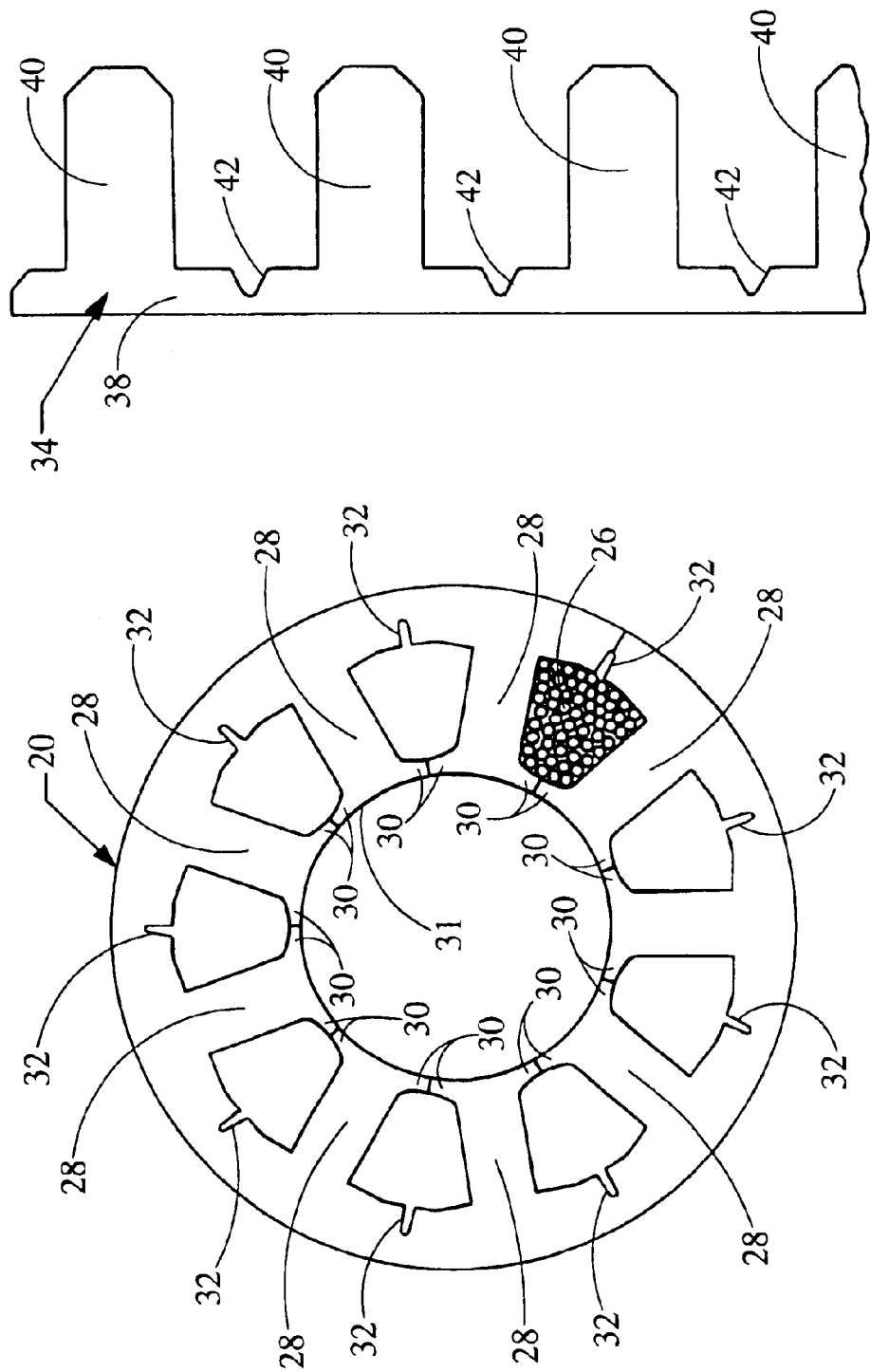

METHOD OF FORMING A STATOR FOR A BRUSHLESS MOTOR

TECHNICAL FIELD

The present invention generally relates to method of manufacturing a stator assembly for an electric motor. More specifically, the present invention relates to a method of manufacturing a stator assembly having no slot openings in an inner diameter, thereby reducing the amount of cogging and improving the manufacturability of the electric motor, especially important for the motors used in Electrical Power Steering Applications.

BACKGROUND

A brushless motor typically includes a rotor which rotates on an axis of the brushless motor and includes permanent magnets arranged circumferentially thereon. A stator which includes electromagnetic coils encircles the rotor. The electromagnetic coils of the stator are energized in order to rotate the rotor. Traditional stator assemblies are typically manufactured by layering thins sheets of steel onto one another and stamping the stator shape from the stack. Referring to FIG. 1, typically, stator assemblies of this type include a plurality of teeth about which electrical wire is coiled. A slot opening is required to be left between the teeth to allow the wire to be placed onto the teeth. The width of the slot opening is a critical design consideration. The slot opening is necessary in a stator made this way to allow the wire to be placed to the teeth. The wider the slot openings, the larger the wire that can be wrapped around the teeth and the more efficiently the coils can be formed around the teeth. Therefore, one aspect provides that the larger the slot opening, the more efficient in manufacturing the electric motor. However, the slot openings also cause cogging of the electric motor. The slot openings cause breaks in the magnetic fields which disturbs the torque generated by the electrical motor. The wider the slot openings, the more severe the cogging of the electric motor. Therefore, another aspect provides that the smaller the slot opening, the less cogging will be experienced by the electric motor. Therefore, there is a need for a method of forming a stator assembly which will allow wire coils to be formed around the teeth of the stator while eliminating the slot openings.

BRIEF DESCRIPTION OF THE DRAWINGS

FIG. 2 is a perspective view of a first preferred embodiment;

FIG. 3 is a top view of the stator prior to forming;

FIG. 4 is a top view of the stator prior to forming and after the coils have been placed to the teeth;

FIG. 5 is a sectional view taken along line 5—5 of FIG. 4;

FIG. 6 is a top view of a stator core of a second preferred embodiment prior to being formed;

FIG. 12b is an enlarged portion of 12a as shown by circle 12b in FIG. 12a.

DETAILED DESCRIPTION OF THE PREFERRED EMBODIMENTS

Figure 1:
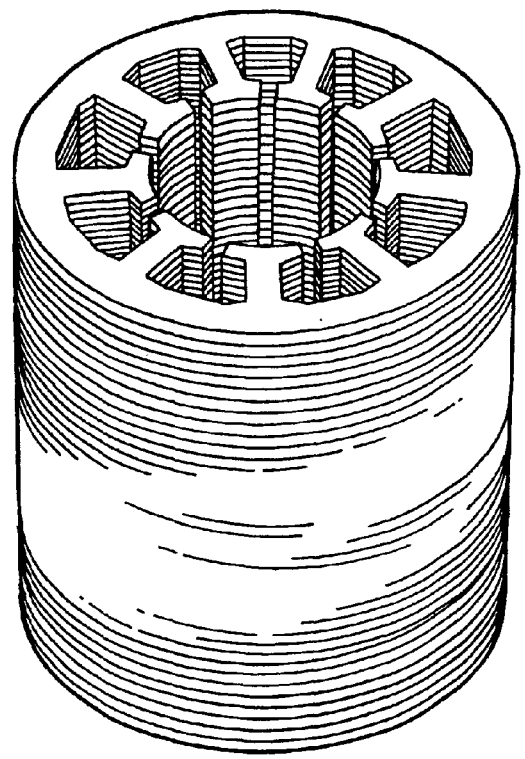
FIG. 1 is a perspective view of a prior art stator.

The following description of the preferred embodiments of the invention is not intended to limit the scope of the invention to these preferred embodiments, but rather to enable any person skilled in the art to make and use the invention.

Referring to FIG. 2, a stator assembly manufactured by the method of the first preferred embodiment is shown generally at 20. The stator assembly 20 includes a stator core 21 having an outer body portion 22 having a plurality of teeth 24 extending radially inward. The method of the first preferred embodiment includes providing a stator core 21 wherein the body portion 22 is generally rectangular and straight as shown in FIG. 3. The teeth 24 extend from the body portion 22 generally perpendicularly.

The stator core 21 is formed by layering multiple thin sheets of steel together and stamping the shape of the stator assembly 20 from the stack into the shape shown in FIG. 3. The process of stacking the layers of steel is known, and the stator core 21, as shown in FIG. 3, can be formed by this known process or any suitable method.

Referring to FIG. 4, electrical coil 26 is then wrapped around each of the extending teeth 24. The size and type of the electrical coil 26 used is dependant on the particular application of the brushless motor and is within the skill of a person in the art.

Once the electrical coil 26 is placed onto the teeth 24, the stator core 21 is then formed into a generally circular shape, wherein each of the extending teeth 24 extend toward a center of the stator assembly 20. Preferably, each of the teeth 24 include a tip portion 28 having extending flanges 30, and the stator assembly 20 is formed by bending the stator core 21 in the direction of the extending teeth 24 until the extending flanges 30 of the tip portions 28 contact the extending flanges 30 of adjacent teeth 24, as shown in FIG. 5. The contacting flanges 30 define an inner diameter 31 of the stator which is continuous and does not have any slot openings, thereby eliminating any cogging within the electrical motor.

Preferably, the stator core 21 includes a notch 32 formed between each of the extending teeth 24. The notches 32 are formed on the same side of the body 22 from which the teeth 24 extend to provide a clearance to allow the stator core 21 to be bent in that direction.

Figure 7:
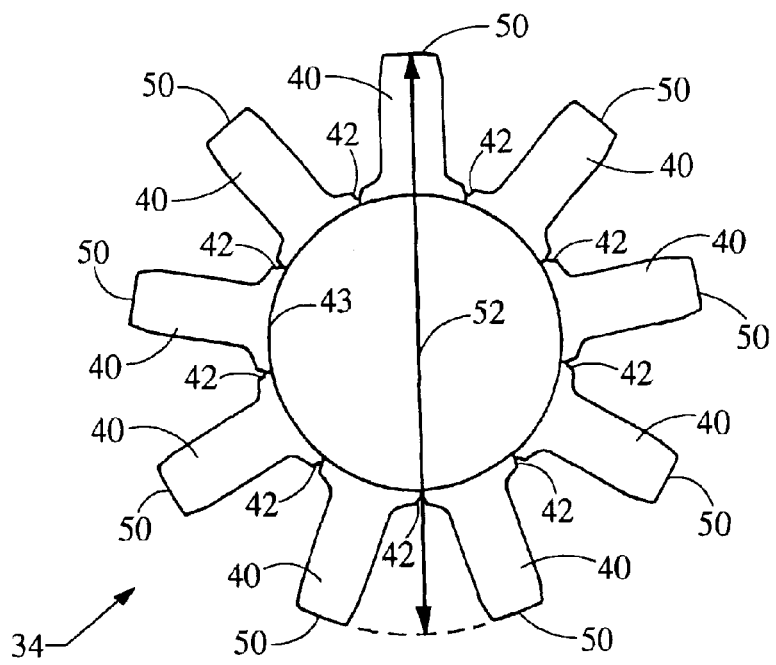
FIG. 7 is a top view of the stator core of the second preferred embodiment after being formed.

A second preferred embodiment includes a stator core 34 and an outer piece 36. Referring to FIG. 6, similarly to the first preferred embodiment, the stator core 34 of the second preferred embodiment includes a body portion 38 which is generally rectangular and straight and includes teeth 40 extending generally perpendicularly therefore. The stator core 34 of the second preferred embodiment is formed by bending the body 38 away from the teeth 40 into a generally circular shape, as shown in FIG. 7. After bending the stator core body 38, the teeth 40 extend radially outward from the stator body 38.

Preferably, the stator body 38 includes notches 42 spaced circumferentially thereabout to provide a relief to allow the stator body 38 to be bent. The notches 42 can be formed on the same side of the body 38 from which the teeth 40 extend, as shown in FIG. 7, or, the notches 42 can be formed on the opposite side of the body 38 (not shown). Once the stator body 38 is bent into a generally circular shape, the side of the body 38 opposite from the extending teeth 40 defines an inner diameter 43 of the stator that is continuous and does not have any slot openings therein.

The electric coils can be placed to the teeth 40 of the second preferred embodiment either by winding the coils directly onto the teeth 40, or by shaping the coils ahead of time and placing the pre-formed coils to the teeth 40. Additionally, the coils can be placed to the teeth 40 either before or after the stator body 38 has been bent into a generally circular shape.

Figure 8:
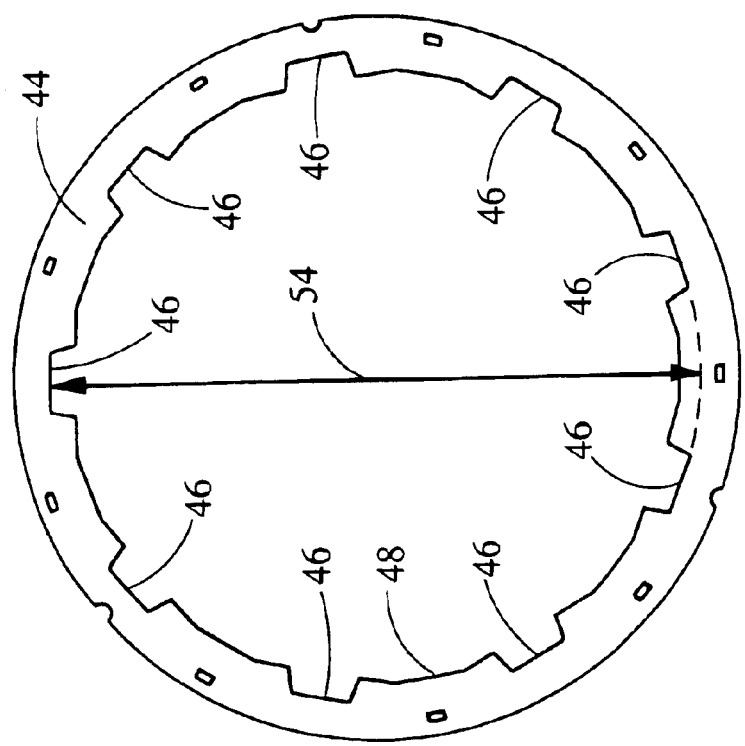
FIG. 8 is a top view of an outer piece of the second preferred embodiment.

Referring to FIG. 8, an outer piece 44 is provided which is formed in the same or similar manner as the stator body 38. The outer piece 44 is generally cylindrical in shape and includes a plurality of recesses 46 formed within an inner surface 48 thereof. Each of the teeth 40 of the stator core 34 have a tip portion 50 and each of the recesses 46 are adapted to receive the tip portion 50 of one of the teeth 40. As shown, the tip portion 50 of the teeth 40 is blunt and squared off and the recesses 46 are correspondingly shaped. It is to be understood that the shape of the tip portions 50 can be other than as shown so long as the shape of the recesses 46 is correspondingly shaped. The stator core 34 is secured within the outer piece 44 by securing the tip portion 50 of each of the teeth 40 within one of the recesses 46, as shown in FIG. 9.

Figure 9:
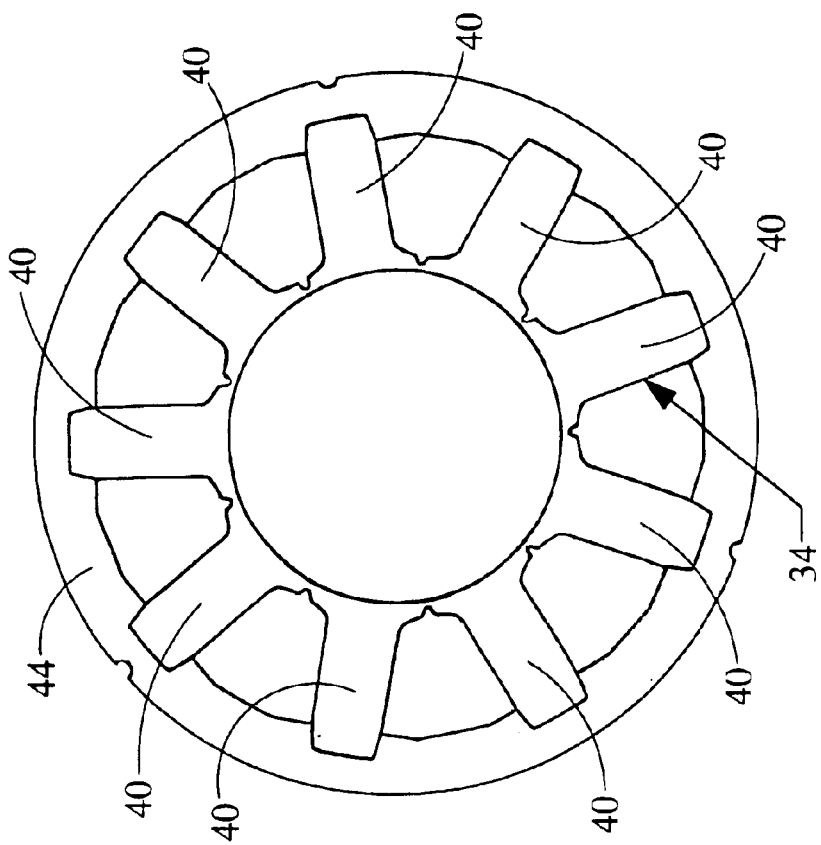
FIG. 9 is a top view of the second preferred embodiment after the stator core has been secured within the outer piece.

Referring to FIGS. 8 and 9, in one variation of the second preferred embodiment, the tip portions 50 of the teeth 40 define an outer diameter 52 of the stator core 34 and the recesses 46 define an inner diameter 54. Preferably, the inner diameter 54 of the recesses 46 is smaller than the outer diameter 52 of the tip portions 50 of the teeth 40. The stator core 34 is secured within the outer piece 44 by press fitting the stator core 34 within the outer piece 44 such that there is an interference fit between the recesses 46 and the tip portions 50 of the teeth 40. Once press fit within the outer piece 44, the stator core 34 is frictionally held within the outer piece 44.

In another variation of the second preferred embodiment, the tip portions 50 of the teeth 40 define an outer diameter 52 of the stator core 34 and the recesses 46 define an inner diameter 54. Preferably, the inner diameter 54 of the recesses 46 is smaller than the outer diameter 52 of the tip portions 50 of the teeth 40. The stator core 34 is secured within the outer piece 44 by heating the outer piece 44 such that the outer piece 44 expands to a point where the inner diameter 54 of the recesses 46 is slightly larger than the outer diameter 52 of the tip portions 50. Once heated, there is a clearance between the recesses 46 and the tip portions 50 which will allow the stator core 34 to be placed within the outer piece 44. Once the stator core 34 has been placed within the outer piece 44 with the tip portions 50 of the teeth 40 aligned with the recesses 46, the outer piece 44 is allowed to cool. Upon cooling, the outer piece 44 will shrink. Since the size of the inner diameter 54 of the recesses 46 in the cooled state is smaller than the outer diameter 52 of the tip portions 50, the cooling of the outer piece will cause an interference fit between the tip portions 50 of the teeth 40 and the recesses 46 of the outer piece 44, whereby the stator core 34 is frictionally held within the outer piece 44.

Figure 10:
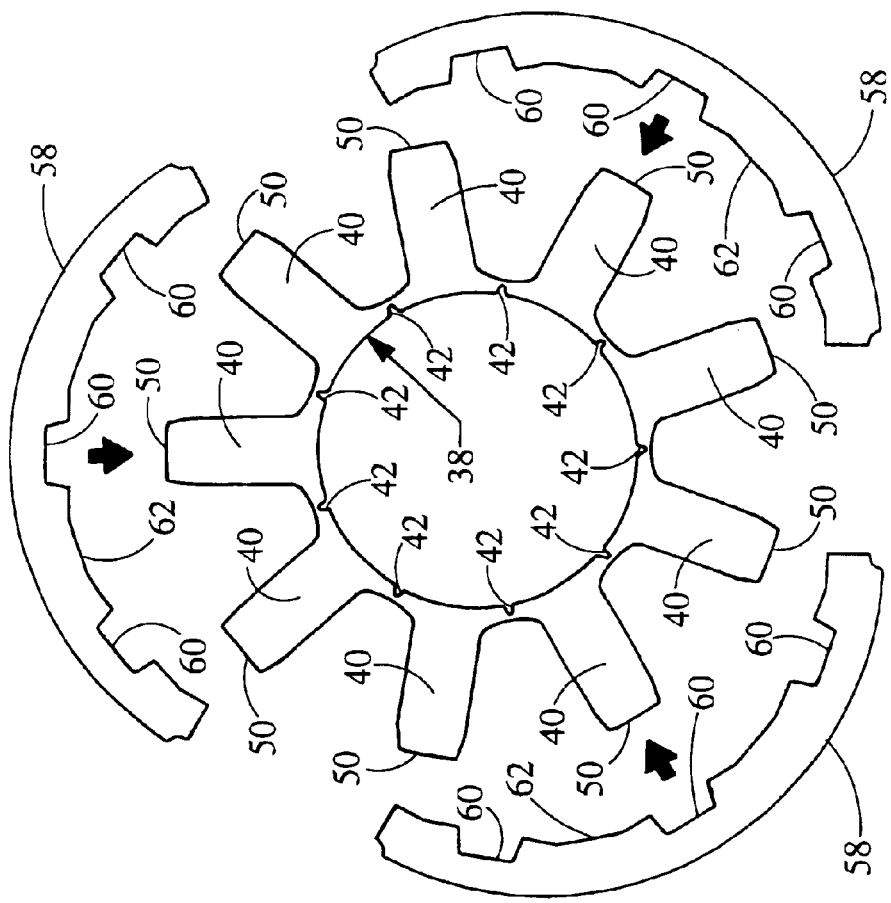
FIG. 10 is an exploded top view of a third preferred embodiment having an outer piece comprising multiple sections.

Referring to FIG. 10, a third preferred embodiment includes a stator core 34 substantially identical to the second preferred embodiment, wherein the stator core 34 includes a body portion 38 which is generally rectangular and straight and includes teeth 40 extending generally perpendicularly therefrom. The stator core 34 of the third preferred embodiment is formed by bending the body 38 away from the teeth 40 into a generally circular shape and includes notches 42 spaced circumferentially thereabout on either side of the stator body 38 to provide a relief to allow the stator body 38 to be bent. The electric coils can be placed to the teeth 40 of the second preferred embodiment either by winding the coils directly onto the teeth 40, or by shaping the coils ahead of time and placing the pre-formed coils to the teeth 40. Additionally, the coils can be placed to the teeth 40 either before or after the stator body 38 has been bent into a generally circular shape.

The third preferred embodiment includes an outer piece 56 which is formed in the same or similar manner as the stator body 38. The outer piece 56 comprises a plurality of arcuate sections 58 which fit together in a generally cylindrical shape. As shown, the outer piece 56 includes three arcuate sections 58, however it is to be understood that any appropriate number of arcuate sections 58 could be used. The arcuate sections 58 include a plurality of recesses 60 formed within an inner surface 62 thereof which are adapted to receive the tip portion 50 of one of the teeth 40 of the stator core 34.

Figure 11:
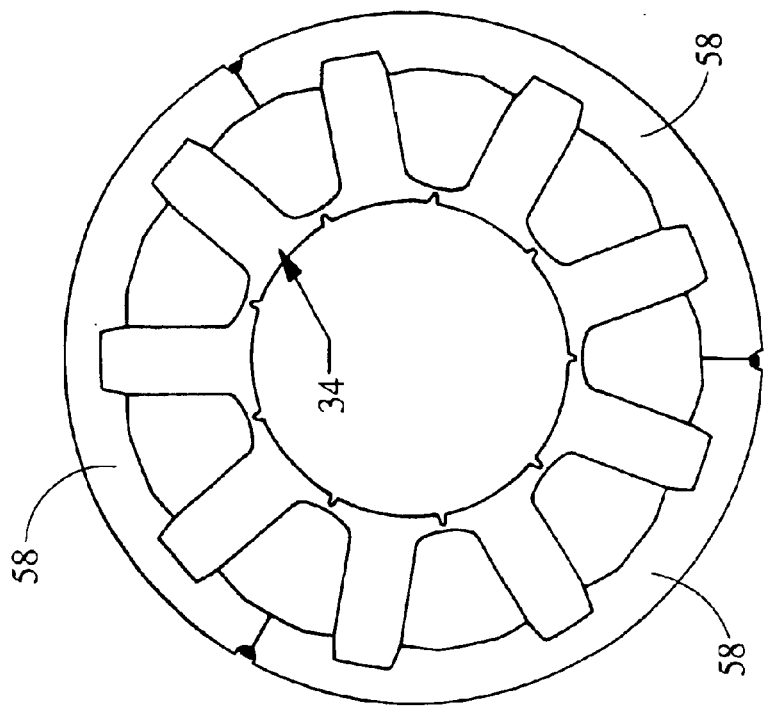
FIG. 11 is a top view of the third preferred embodiment after the outer piece has been secured to the stator core.

Referring to FIG. 11, the stator core 34 is then secured within the outer piece 56 by placing the arcuate sections 58 adjacent one another, with the tip portions 50 of the teeth 40 engaging the recesses 60, such that the arcuate sections 58 encircle the stator core 34. The arcuate sections 58 are then attached to one another such that the stator core 34 is frictionally held within the outer piece 56. Preferably, the arcuate sections are welded to one another, however, it is to be understood that the arcuate sections 58 could be attached to one another by other suitable methods.

Figure 12A:
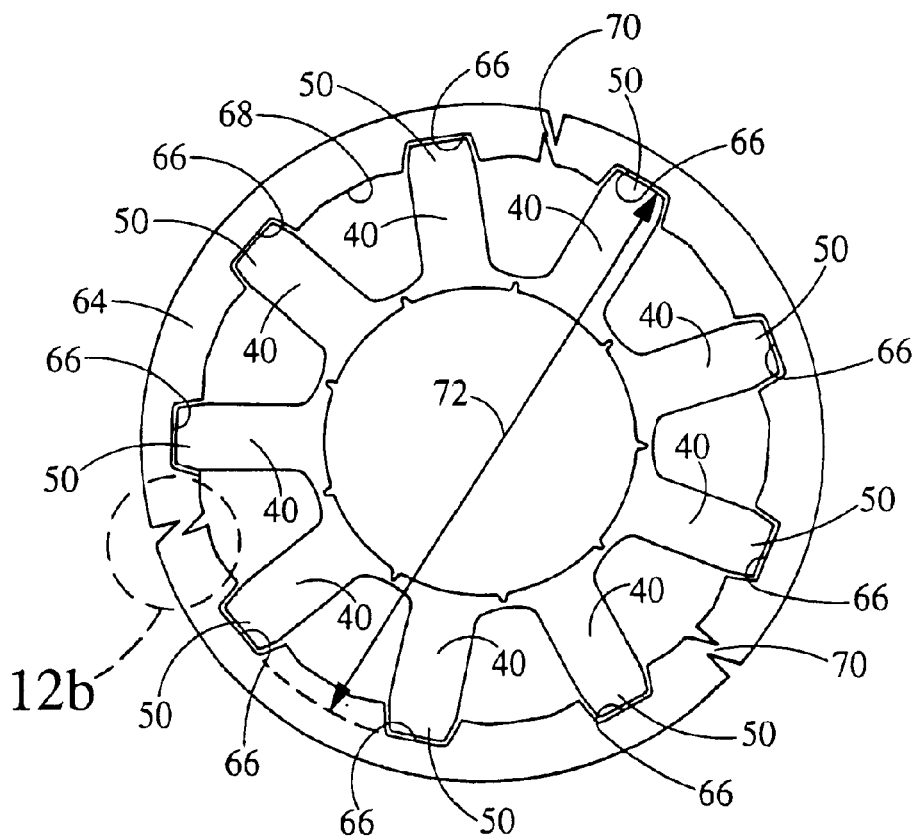
FIG. 12a is a top view of a fourth preferred embodiment wherein a single outer piece is adapted to be crimped onto the stator core.
Figure 12B:
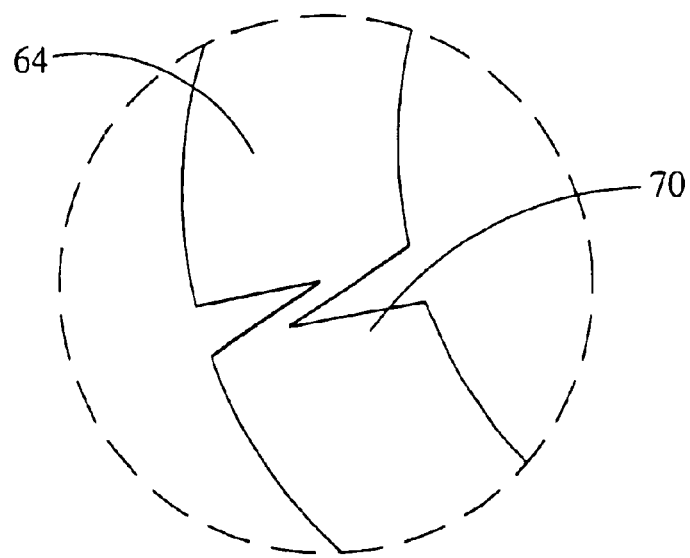

Referring to FIGS. 12a and 12b, a fourth preferred embodiment includes a stator core 34 substantially identical to the second and third preferred embodiments, wherein the stator core 34 includes a body portion 38 with teeth 40 extending therefrom, is formed by bending the body 38 away from the teeth 40 into a generally circular shape, and includes notches 42 spaced circumferentially thereabout on either side of the stator body 38 to provide a relief to allow the stator body 38 to be bent. The electric coils can be placed to the teeth 40 either by winding directly onto the teeth 40, or by placing pre-formed coils to the teeth 40.

The fourth preferred embodiment includes an outer piece 64 which is formed in the same or similar manner as the stator body 38. The outer piece 64 is generally cylindrical in shape and includes a plurality of recesses 66 formed within an inner surface 68 thereof which are adapted to receive the tip portion 50 of one of the teeth 40 of the stator core 34. The outer piece 64 of the fourth preferred embodiment further includes a plurality of crimping zones 70 which are adapted to allow the outer piece 64 to be crimped to a smaller size. As shown, the outer piece 64 includes three crimping zones 70, however it is to be understood that any appropriate number of crimping zones 70 could be used.

Similarly to the second preferred embodiment, the tip portions 50 of the teeth 40 define an outer diameter 52 of the stator core 34. The recesses 66 define a first inner diameter 72 prior to the outer piece 64 being crimped, and a second inner diameter after the outer piece 64 is crimped. The first inner diameter 72 of the recesses 66 is slightly larger than the outer diameter 52 of the tip portions 50 of the teeth 40, however, the second inner diameter of the recesses 66 is slightly smaller than the outer diameter 52.

The stator core 34 is then secured within the outer piece 64 by placing the stator core 34 within the outer piece 64 with the tip portions 50 of the teeth 40 aligned with the recesses 66, and crimping the outer piece 64 onto the stator core 34. Since the second inner diameter of the recesses 66 is smaller than the outer diameter 52 of the tip portions 50, the crimping of the outer piece 64 will cause an interference fit between the tip portions 50 of the teeth 40 and the recesses 66 of the outer piece 64, whereby the stator core 34 is frictionally held within the outer piece 64.

The foregoing discussion discloses and describes four preferred embodiments. One skilled in the art will readily recognize from such discussion, and from the accompanying drawings and claims, that changes and modifications can be made to the preferred embodiments without departing from the scope of the inventive concepts as defined in the following claims. The preferred embodiments have been described in an illustrative manner, and it is to be understood that the terminology which has been used is intended to be in the nature of words of description rather than of limitation.

What is claimed is:

1. A method of forming a stator for a brushless motor comprising:

providing a stator core having a generally rectangular body and having a plurality of teeth extending generally perpendicularly from a side of the body, each of the teeth including a tip portion having extending flanges; and bending the body of the stator core in the direction of the extending teeth until the extending flanges of the tip portions contact the extending flanges of adjacent teeth, thereby forming the stator core into a generally circular shape.

2. The method according to claim 1 further including placing a coil of electrical wire around each of the teeth prior to forming the stator core into a generally circular shape.

3. The method according to claim 2 wherein placing a coil of electrical wire around each of the teeth includes wrapping the electrical wire around each tooth.

4. The method according to claim 2 wherein placing a coil of electrical wire around each of the teeth includes forming a plurality of coils of electrical wire and placing one of the plurality of coils on each of the teeth.

* * * * *